Jan. 31, 1961   R. L. WORRELL   2,969,862
DEFLECTOR
Filed March 26, 1957
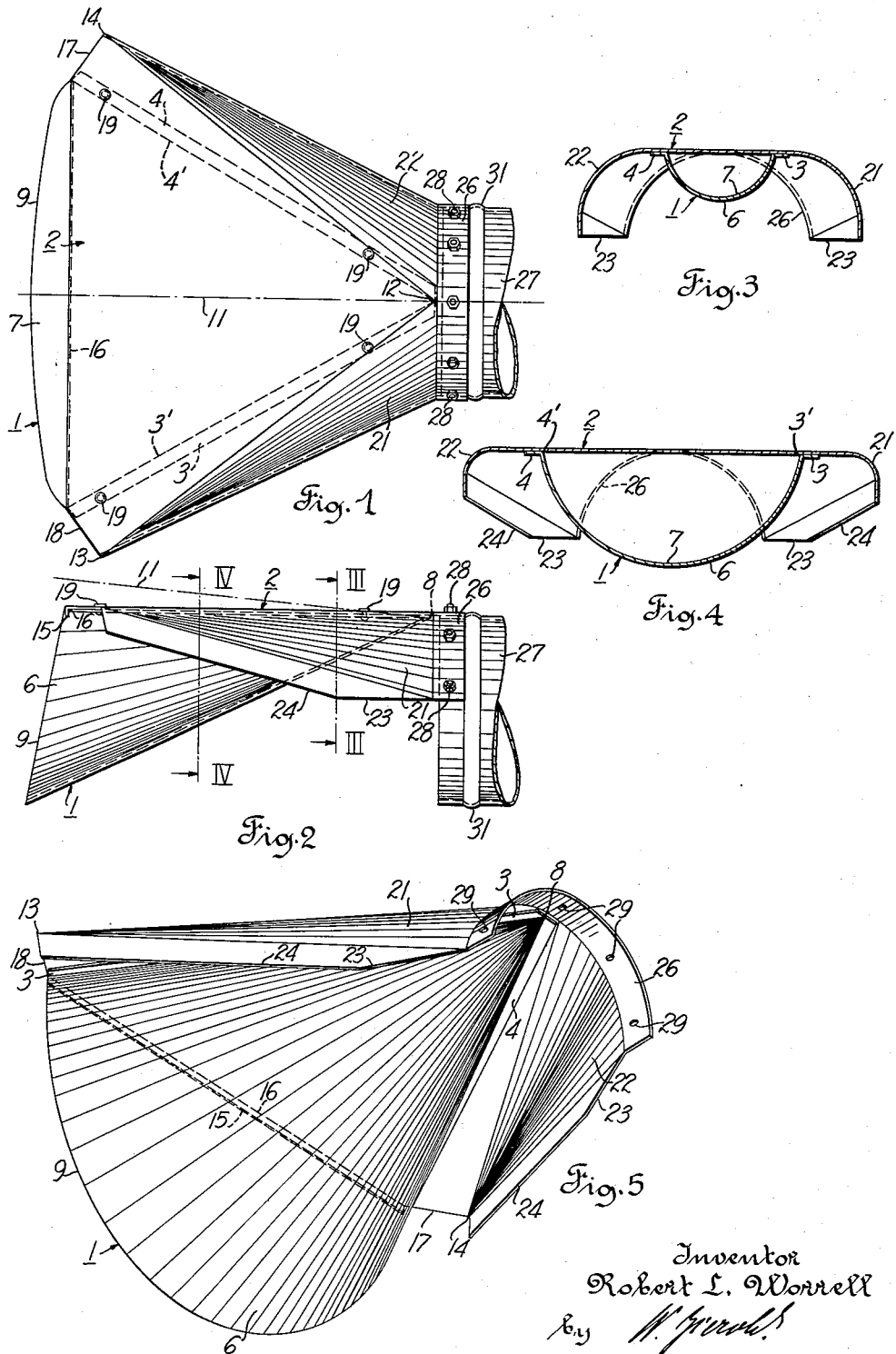
Inventor
Robert L. Worrell
by
Attorney

United States Patent Office 2,969,862
Patented Jan. 31, 1961

2,969,862
DEFLECTOR

Robert L. Worrell, La Porte, Ind., assignor to Allis-Chalmers Manufacturing Company, Milwaukee, Wis.

Filed May 26, 1957, Ser. No. 648,732

7 Claims. (Cl. 193—4)

This invention relates to material handling apparatus, and it is concerned more particularly with a deflector for attachment to the discharge end of a material conveying tube.

In the operation of harvester threshers the straw, that is, the crop material from which the grain or seed has been removed, is usually disposed of by dropping it on the field while the machine is in progress. Various types of devices have heretofore been suggested for spreading the waste material on the ground evenly rather than in streaks or bunches so that it may be readily plowed under when the field is prepared for the next crop. For instance, it has heretofore been suggested to pass the waste material through a chopping device which not only cuts long stalks into short pieces but which also ejects the entire mass of chopped waste material from the machine at a high linear velocity and in a generally horizontal direction. In order to disperse the straw and other waste material which is ejected from such a chopping device the ejected material may be directed against a deflector which is suitably installed on the machine so that it will be impinged by the material which is accelerated by the cutting elements of the chopper, or by an air blast, or by the combined action of the cutting elements and an air blast.

Attempts have been made during the past to provide a satisfactory deflector for the mentioned purpose, but such attempts have not been entirely successful, particularly in the matter of achieving an even distribution of the chopped waste material on a ground area of limited width, such as the path of cut in rear of a harvester thresher.

Generally, it is an object of the invention to provide an improved deflector for attachment to a tube or the like through which loose material, such as the waste material of a harvester thresher, is ejected at high velocity, and which deflector will cause spreading of the material over a ground area of given length and width with a substantial degree of evenness or uniformity.

More specifically, it is an object of the invention to provide a deflector of the above mentioned character by means of which the loose material may be spread downward from a horizontally disposed exhaust pipe upon a ground area of limited width behind a harvester thresher.

Another object of the invention is to provide a deflector of the above mentioned character which is light and compact and which lends itself to manufacture at relatively low cost.

These and other objects and advantages are attained by the present invention, various novel features of which will be apparent from the description herein and the accompanying drawing disclosing an embodiment of the invention, and will be more particularly pointed out in the appended claims.

In the drawings:

Fig. 1 is a top view of a deflector and of part of a tube mounting the deflector;

Fig. 2 is a side view of the assembly of parts shown in Fig. 1;

Fig. 3 is a section on line III—III of Fig. 2, the tube being omitted;

Fig. 4 is a section on line IV—IV of Fig. 2, the tube being omitted; and

Fig. 5 is a perspective three quarter bottom view of the deflector shown in Figs. 1 and 2.

The deflector shown in the drawing comprises two principal components, namely, a single piece tapered dispersion element which is generally designated by the reference character 1, and a single piece backing element which is generally designated by the reference character 2.

The dispersion element 1 is made of sheet metal and has a pair of coplanar, relatively diverging flange members 3 and 4. Disposed between the diverging flange members 3 and 4 is a conically dished portion of the dispersion element, which presents homologous outer and inner, longitudinally bisectioned cone surfaces 6 and 7, respectively. The conically dished portion of the dispersion element 1 is located at one side of the common plane of the flange members 3 and 4, and the outer cone surface 6 merges with the flange members within said plane along lines 3' and 4' as indicated in Figs. 1 and 4. The lines 3' and 4' represent relatively diverging, coplanar edge portions of the longitudinally bisectioned cone surface 6 of the dispersion element. The view of Fig. 5 shows a major part of the outer cone surface 6, and it will be seen that the apex 8 of the cone lies in the same plane as the edge portions 3' and 4'. The base edge 9 of the cone surface 6 extends circularly about the cone axis which is indicated in Figs. 1 and 2 by the dash-dotted line 11. As shown in Fig. 2, the cone axis 11 is upwardly inclined at a small angle relative to the common plane of the edge portions 3' and 4' (Figs. 1 and 4), and the arcuate length of the base edge 9 is therefore somewhat less than a half circle. The inner surface 7 of the conically dished portion of the dispersion element 1 is homologous to the outer surface 6, that is, the inner surface 7, like the outer surface 6, is a longitudinally bisectioned cone surface between the coplanar, relatively diverging edge portions 3' and 4' of the dispersion element.

The backing element 2, like the dispersion element 1, is made of sheet metal. It comprises a flat, generally triangular portion which has a front corner 12 (Fig. 1) directly over the apex 8 (Fig. 5) of the dispersion element, and two rear corners 13 and 14 in laterally outward overhanging relation to the rear ends of the diverging edge portions 3' and 4', respectively, of the dispersion element 1. A straight rear edge 16 of the backing element 2 extends between the rear ends of the edge portions 3' and 4', and for reinforcement purposes a strip or flange 15 (Fig. 2) is bent downwardly along the edge 16 at substantially right angles to the plane of the triangular portion of the backing element. Short rear edge portions 17 and 18 of the backing element 2 extend from the corners 13 and 14, respectively, in rearwardly and inwardly inclined directions to the adjacent ends of the rear edge 16. The dispersion element 1 and the backing element 2 are rigidly secured together, preferably by rivets 19 and spot welds, not shown, between each of the flanges 3 and 4 and the overlying triangular portion of the backing element. In the connected condition of the parts as shown in the drawing, the triangular portion of the backing element 2 extends in overlying relation to the inner cone surface 7 of the dispersion element 1.

The backing element 2 has two side portions 21 and 22 which extend laterally outward from the dispersion element 1 along the diverging edge portions 3' and 4', respectively, and which are bent, as shown in Figs. 3, 4 and 5, so as to depend from the plane containing the edge portions 3' and 4', in spaced relation to the adjacent outer cone surface 6 of the dispersion element. Each side portion 21 and 22 serves as a side shield, one at the near side and the other at the far side of the deflector shown in Fig. 5. The bottom edge of the near side shield 21, as shown in Fig. 2, has a straight forward portion 23 which extends parallel to the common plane of the edge portions 3' and 4'. Another straight bottom edge portion 24 of the near side shield 21 in Fig. 2 extends rearwardly and upwardly from the rear end of the bottom edge portion 23.

Both bottom edge portions 23 and 24 lie in a common vertical plane which extends at the near side of the backing element shown in Fig. 2 through the corner 13 in a forward and inward direction as shown in Fig. 1. The portion of the side shield 21 which extends between the flange 3 and the bottom edge 23, 24 is curved, as indicated in Figs. 3 and 4, so as to present a concave inner surface in spaced, generally confronting relation to the adjacent portion of the tapered dispersion element 1.

The foregoing explanations with respect to the side shield 21 similarly apply to the side shield 22 at the far side of the deflector shown in Fig. 5. That is, the side shield 22, like the side shield 21, has a bottom edge portion 24 in oblique relation to the plane containing the diverging edge portions 3' and 4' of the dispersion element 1, the spacing of the bottom edge 24 from said plane being greater at the end of the oblique bottom edge next to the apex end of the dispersion element than at the end of the oblique bottom edge next to the base end of the dispersion element.

At the apex end of the dispersion element 1 a flange member 26 (Fig. 5) is connected with the side shields 21 and 22 for attaching the deflector assembly to the discharge end of a cylindrical, horizontally disposed conveying tube 27. The flange 26 is curved cylindrically, and its arcuate length is somewhat less than a half circle, as shown in Figs. 3 and 4. The radius of curvature of the flange 26 is the same or nearly the same as the outside diameter of the tube 27, and the plane of the triangular portion of the backing element 2 extends tangentially to the circle of curvature of the flange 26 at a point midway between its arcuately opposite ends.

The deflector assembly comprising the dispersion element 1 and backing element 2 is rigidly secured to the tube 27 by a circumferential series of bolts 28 which are passed through radial holes 29 in the flange 26 and through registering holes, not shown, in the tube 27, the bolts 28 having nuts for drawing the flange 26 radially against the cylindrical outer surface of the tube 27. An annular shoulder 31 may be radially extruded from the tube 27 for axial abutment with the axial end face of the flange 26.

The tube 27 may be the exhaust pipe of a straw chopping device on a harvester thresher, not shown. When the chopping device is in operation, a mass of waste material consisting chiefly of short pieces of straw will be ejected at a high linear speed from the tube 27 in the axial direction of the latter. From Fig. 1 it will be noted that the base edge 9 of the dispersion element 1 spans the rear edge 16 of the backing element 2 which is more than twice as wide as the tube 27, and from Fig. 2 it will be noted that the base edge 9 of the dispersion element 1 drops from the triangular, plane portion of the backing element 2 which is tangential to the tube 27 at its highest point, to a point whose distance from said plane is greater than the inside diameter of the tube 27. As a result of this proportioning of the dispersion element in relation to the tube 27, the entire mass of waste material which is ejected from the tube 27 will become subject to deflection by the conically dished portion of the dispersion element 1. That is, straw particles which are ejected at high speed from the axial discharge opening of the conveyor tube 27 in the axial direction of the latter will ricochet from the external cone surface of the deflector and fall upon the ground at a considerable horizontal distance therefrom. However, the mass of ejected material will not be split into separate streams, one to the right and one to the left, but it will rather be spread out in the form of a fan shaped pattern and, depending on the velocity of emission, a ground area of a certain length and width will be covered by a substantially uniform layer of ejected material. The side shields 21 and 22 of the backing element control the lateral spread of the ejected material and, therefore, the width of the ground area which will be covered by the material emitted from the tube 27.

As shown in Figs. 1, 2 and 5, the deflector is secured to the material conveying tube 27 in axially overhanging relation to the discharge end of the latter and in such angular relation thereto that the apex end of the dispersion element 1, and more particularly the apex 8 of the outer longitudinally bisectioned cone surface 6, is located at the periphery of the tube 27, and so that the outer cone surface is presented exteriorly of the tube 27 in expanding relation to a stream of material which is ejected axially from the tube 27.

It should be understood that it is not intended to limit the invention to the particular forms and details described hereinabove, and that the invention includes such other forms and modifications as are embraced by the scope of the appended claims.

What is claimed is:

1. For use as a straw distributor on harvester threshers, a deflector connectable to an axial discharge opening of a material conveying tube in such relation thereto that straw particles ejected at high speed from said tube will ricochet from said deflector and fall upon the ground at a considerable horizontal distance therefrom, said deflector comprising, in combination, a tapered dispersion element presenting a longitudinally bisectioned cone surface between relatively diverging, coplanar edge portions thereof; side shields extending, respectively, along said edge portions and connected with said dispersion element in laterally overhanging relation thereto, and means including a flange member engageable with said material conveying tube and connected with said side shields at the apex end of said dispersion element for securing said deflector to said tube in axially overhanging relation to the discharge end of the latter and in such angular relation thereto that said apex end of said dispersion element will be located at the periphery of said tube and said cone surface will be presented exteriorly of said tube in expanding relation to a stream of material ejected axially from said tube.

2. A deflector as set forth in claim 1, wherein each of said side shields has a depending portion in spaced relation to the adjacent portion of said bisectioned cone surface of said dispersion element.

3. A deflector as set forth in claim 2, wherein said depending portions of said side shields have bottom edges, respectively, in oblique relation to the plane containing said diverging edge portions of said dispersion element, the spacing of said bottom edges from said plane being greater at the ends thereof next to the apex end of said dispersion element than at the ends thereof next to the base end of said dispersion element.

4. A deflector as set forth in claim 3, wherein each of said side shields is curved to present a concave inner surface in spaced confronting relation to the adjacent portion of said tapered dispersion element.

5. For use as a straw distributor on harvester threshers, a deflector connectable to an axial discharge opening of a material conveying tube in such relation thereto that straw particles ejected at high speed from said tube will ricochet from said deflector and fall upon the ground at a considerable horizontal distance therefrom, said deflector comprising, in combination, a sheet metal dispersion element presenting a pair of coplanar, relatively diverging flange members and homologous outer and inner longitudinally bisectioned cone surfaces at one side of the common plane of said flange members and merging with the latter within said plane; a single piece sheet metal backing element secured to said flange members, portions of said backing element extending laterally outward from said dispersion element along said flange members, respectively, and being bent so as to depend therefrom in spaced relation to the adjacent outer cone surface of said dispersion element, and means for securing said deflector to said tube in axially overhanging relation to the discharge end of the latter and in such angular relation thereto that the apex end of said outer cone surface will be located at the periphery of said tube and said outer cone surface will be presented exteriorly of said tube in expanding relation to a stream of material ejected axially from said tube.

6. A deflector as set forth in claim 5, wherein said backing element includes a triangular portion in overlying relation to said inner cone surface of said dispersion element.

7. A deflector as set forth in claim 6, wherein a flange member for securing said deflector in said axially overhanging relation to said discharge end of said conveying tube is integrally connected with said laterally outward extending portions of said backing element.

References Cited in the file of this patent

UNITED STATES PATENTS

| | | |
|---|---|---|
| 1,813,590 | Stock | July 7, 1931 |
| 1,862,396 | Gray et al. | June 7, 1932 |
| 1,869,628 | Stock | Aug. 2, 1932 |
| 1,947,011 | Karthauser | Feb. 13, 1934 |

FOREIGN PATENTS

| | | |
|---|---|---|
| 629,052 | Germany | Apr. 22, 1936 |
| 655,204 | Great Britain | July 11, 1951 |